US008023441B2

(12) United States Patent
Werb et al.

(10) Patent No.: US 8,023,441 B2
(45) Date of Patent: Sep. 20, 2011

(54) METHOD FOR REPORTING AND ACCUMULATING DATA IN A WIRELESS COMMUNICATION NETWORK

(75) Inventors: Jay Philip Werb, Newton, MA (US); Victor A. Berry, Ashburnham, MA (US)

(73) Assignee: Sensicast Systems, Needham, MA (US)

( * ) Notice: Subject to any disclaimer, the term of this patent is extended or adjusted under 35 U.S.C. 154(b) by 954 days.

(21) Appl. No.: 11/312,269

(22) Filed: Dec. 20, 2005

(65) Prior Publication Data

US 2006/0187866 A1    Aug. 24, 2006

Related U.S. Application Data

(60) Provisional application No. 60/637,644, filed on Dec. 20, 2004.

(51) Int. Cl.
*G08C 17/00* (2006.01)
*H04L 12/66* (2006.01)
*H04B 1/16* (2006.01)

(52) U.S. Cl. ........ 370/311; 370/238; 370/252; 370/310; 370/338; 370/389; 370/254; 370/347; 370/436; 455/343.1; 455/572; 455/574

(58) Field of Classification Search .......... 370/228–463; 455/343.1, 550–574
See application file for complete search history.

(56) References Cited

U.S. PATENT DOCUMENTS

| | | | | |
|---|---|---|---|---|
| 5,694,335 | A * | 12/1997 | Hollenberg | 726/16 |
| 6,326,825 | B1 * | 12/2001 | Walley | 327/160 |
| 6,453,181 | B1 * | 9/2002 | Challa et al. | 455/574 |
| 6,844,814 | B2 * | 1/2005 | Chin et al. | 340/539.22 |
| 7,096,359 | B2 * | 8/2006 | Agrawal et al. | 713/168 |
| 7,119,676 | B1 * | 10/2006 | Silverstrim et al. | 340/531 |
| 7,135,976 | B2 * | 11/2006 | Neff et al. | 340/572.1 |
| 7,242,294 | B2 * | 7/2007 | Warrior et al. | 340/539.22 |

(Continued)

FOREIGN PATENT DOCUMENTS

EP    1661318 A2 *    5/2006

(Continued)

OTHER PUBLICATIONS

Annex dated May 5, 2006, International Application No. PCT/US2005/046169.

*Primary Examiner* — Ayaz R Sheikh
*Assistant Examiner* — Venkatesh Haliyur
(74) *Attorney, Agent, or Firm* — Foley & Lardner, LLP; Christopher J. McKenna

(57) ABSTRACT

A method and apparatus for coordinating communication in a wireless sensor network may include a plurality of nodes, such as routers, edge nodes, data accumulators and/or gateways. Time management functions, such as determining an elapsed time, may be controlled based on a detected temperature, e.g., a temperature detected at a node, and/or based on a detected clock skew between two or more clocks in two or more different devices. Accurate time management may allow for devices to more accurately coordinate communication instances, e.g., communication that occurs at periodic wake up times. A cluster head, such as a data accumulator, may be associated with a network after its initial formation and cause nodes in the network to alter their hierarchy in the network, thereby making the cluster head accumulator a parent to nodes in the network. Nodes having a relatively lower hop count may have a higher battery capacity than nodes having a higher hop count.

22 Claims, 5 Drawing Sheets

U.S. PATENT DOCUMENTS

| | | | |
|---|---|---|---|
| 7,313,399 B2 * | 12/2007 | Rhee et al. | 455/445 |
| 7,324,824 B2 * | 1/2008 | Smith et al. | 455/456.1 |
| 7,356,561 B2 * | 4/2008 | Balachandran et al. | 709/203 |
| 7,593,117 B2 * | 9/2009 | Bennison et al. | 356/614 |
| 7,675,863 B2 * | 3/2010 | Werb et al. | 370/241 |
| 7,701,858 B2 * | 4/2010 | Werb et al. | 370/241 |
| 2001/0028301 A1 * | 10/2001 | Geiger et al. | 340/5.91 |
| 2003/0151513 A1 * | 8/2003 | Herrmann et al. | 340/573.1 |
| 2003/0152041 A1 | 8/2003 | Herrmann et al. | |
| 2004/0090329 A1 * | 5/2004 | Hitt | 340/552 |
| 2004/0100917 A1 | 5/2004 | Perkins et al. | |
| 2004/0218602 A1 * | 11/2004 | Hrastar | 370/390 |
| 2004/0235468 A1 * | 11/2004 | Luebke et al. | 455/426.1 |
| 2005/0093702 A1 * | 5/2005 | Twitchell | 340/572.8 |
| 2005/0155839 A1 * | 7/2005 | Banks et al. | 194/302 |
| 2005/0200480 A1 * | 9/2005 | Caras et al. | 340/539.22 |
| 2006/0002368 A1 * | 1/2006 | Budampati et al. | 370/351 |
| 2006/0029061 A1 * | 2/2006 | Pister et al. | 370/389 |
| 2006/0046664 A1 * | 3/2006 | Paradiso et al. | 455/96 |
| 2007/0115827 A1 * | 5/2007 | Boehnke et al. | 370/236 |
| 2007/0258508 A1 * | 11/2007 | Werb et al. | 375/140 |
| 2007/0276270 A1 * | 11/2007 | Tran | 600/508 |
| 2008/0004904 A1 | 1/2008 | Tran | 705/2 |
| 2008/0036589 A1 * | 2/2008 | Werb et al. | 340/539.22 |
| 2008/0037431 A1 * | 2/2008 | Werb et al. | 370/241 |
| 2008/0037454 A1 * | 2/2008 | Werb et al. | 370/310 |
| 2008/0037569 A1 * | 2/2008 | Werb et al. | 370/406 |
| 2008/0040509 A1 * | 2/2008 | Werb et al. | 709/242 |
| 2008/0273547 A1 * | 11/2008 | Phinney | 370/437 |

FOREIGN PATENT DOCUMENTS

WO    WO 2005010214 A2 *    2/2005

* cited by examiner

METHOD FOR REPORTING AND ACCUMULATING DATA IN A WIRELESS COMMUNICATION NETWORK

This application claims the benefit of U.S. Provisional Application No. 60/637,644, filed Dec. 20, 2004, which is hereby incorporated by reference in its entirety.

BACKGROUND OF INVENTION

1. Field of Invention

This invention relates to wireless communication networks in which wireless communication devices send information to each other and/or a host computer.

2. Description of Related Art

As advances in technology enable the development of ever-smaller wireless devices such as sensors and actuators, there has been increasing interest in self-configuring multihop wireless networks of these devices, together with additional communication devices and software. Such networks, typically known as Wireless Sensor Networks (WSNs), have a number of potential uses. For example, WSNs may be employed for automated meter reading (AMR) applications, such as for metering residential heat, electricity, or water usage.

In examining the operation of WSNs, some questions arise: How might data be reported from device to device within a WSN? How may data from a network of devices be accumulated and passed to devices or applications outside the WSN? What are some requirements for timely, low power communication within such WSNs? What features may be incorporated to improve system reliability? Various aspects of the invention described below relate to reporting and accumulating data in such wireless networks.

SUMMARY OF INVENTION

In one aspect of the invention, a method for coordinating communication in a wireless sensor network includes associating a first node with a wireless sensor network having at least two nodes associated with each other in a parent/child relationship. The first node may be associated with the wireless sensor network such that the first node functions as a parent or a child to at least one other node. A wake up time may be determined for the first node to wake up and listen for, or to broadcast, a signal regarding communication with a parent or child node. The wake up time may be determined based on a detected temperature at the first node. For example, operating temperatures local to a device, such as a router, edge node or other in a wireless sensor network, may affect the operation of a timer. Thus, differences in temperatures between different nodes in the network may affect the devices' ability to coordinate communications with each other if the communication is scheduled to occur at specified intervals. By adjusting for temperature conditions at one or more nodes, time periods in different devices may be more accurately or consistently measured. Any adjustment made for temperature may cause an adjustment to an elapsed time measurement made by a clock (e.g., an elapsed time period measured by a clock may be adjusted by some temperature varying factor) or to a expected time period (e.g., a wake up time period between communication intervals may be adjusted based on measure temperature to account for variations in clock operation).

In another aspect of the invention, a method for coordinating communication in a wireless sensor network includes associating a first node with a wireless sensor network having at least two nodes associated with each other in a parent/child relationship. The first node may be associated with the wireless sensor network such that the first node functions as a parent or child to at least one other node. A wake up time may be determined for the first node to wake up and listen for a signal regarding communication with a second node that has a parent or child relationship with the first node. The wake up time may be determined based on a determined clock skew between a clock in the first node and a clock in the second node. Manufacturing or other variations between clocks used in two or more devices in the network may result in time being measured differently by the devices. A node, such as an edge node, router or other, may determine a clock skew (a difference in time measurement) between the node and another device with which the node communicates. For example, an edge node may expect a parent router to beacon at a predetermined time, but in fact, the router may beacon at the predetermined time+/−a clock skew. For future communication times, the edge node may use the clock skew to adjust an elapsed time period or expected time period to determine when the router will wake up for communication.

In one aspect of the invention, a node may use temperature adjustment and a clock skew to determine a wake up time for communication with another node in a wireless sensor network. For example, a node may adjust elapsed time measured by its clock based on a measured temperature, and adjust wake up times when the node is scheduled to communication with one or more other nodes based on a clock skew determined for each of the other nodes. The node may use a different clock skew for each other node with which the node communicates so that differences in clock operation may be optimally compensated.

In another aspect of the invention, a method for forming a wireless sensor network may include providing a plurality of nodes at a location where at least two of the nodes are adapted and positioned relative to each other to form a wireless sensor network. A signal may be beaconed from a first node that represents that the first node is not associated with a wireless sensor network and that the first node is adapted to function as a parent node. A second node may be associated with the first node such that the second node is a child of the first node and the first node is a parent of the second node, thereby forming, at least in part, a wireless sensor network. A third node that is capable of functioning as a cluster head may initially be associated with the wireless sensor network as a child of an association node in the wireless sensor network, and thereafter the association node may be commanded to function as a child of the third node such that the third node functions as a parent to the association node. In accordance with this aspect of the invention, a cluster head, such as a data accumulator or gateway, may be associated with an existing wireless sensor network such that the cluster head is initially made a child of at least one node (e.g., a router) in the network. Thereafter, the cluster head may instruct one or more nodes in the network (including its initial one or more parents) to adjust their hierarchical function in the network so that the cluster head functions as a parent to nodes in the network. The cluster head may further adjust the hierarchical function of nodes in the network, such as reversing existing parent/child relationships. (Designation of "association node" does not necessarily require the node to have any specialized capability. Rather, an "association node" may be any device with which the cluster head initially associates. For example, the "first" or "second" node may function as the "association node.")

In another aspect of the invention, a wireless sensor network includes a cluster head, a shadow cluster head, and a plurality of nodes in communication with the cluster head and the shadow cluster head. The plurality of nodes may include at least one router or at least one edge node, e.g., at least one of the nodes including an associated sensor to collect sensor data. The cluster head and the shadow cluster head may be adapted to receive communications from a same set of nodes, but the cluster head and the shadow cluster head may use different multipath profiles to communicate with nodes in radio range. For example, the cluster head may communicate wirelessly with a same set of nodes, but communicate with those nodes using different communication paths. Thus, the shadow cluster head may provide a redundant link from the set of nodes to the cluster head.

In another aspect of the invention, a wireless sensor network may include a data accumulator, and a plurality of nodes in communication with the cluster head. The plurality of nodes may include at least one router or at least one edge node that provides sensor data to the data accumulator, and the data accumulator may be adapted to communicate wirelessly with a mobile device to transmit the sensor data to the mobile device. The data accumulator and the mobile device may use a same radio MAC and PHY, and the mobile device may use an IEEE 802.15.4 radio to communicate with the data accumulator. The nodes and the data accumulator may communicate wirelessly at a frequency of about 868 MHz, and the data accumulator and the mobile device may communicate at a frequency of about 2.4 GHz.

In another aspect of the invention, a method for forming a wireless sensor network includes providing a plurality of routers that are configured and arranged to form a wireless sensor network in which routers have a hierarchical parent/child relationship. A gateway may be provided in communication with the wireless sensor network, where the gateway is adapted to send and receive signals for the wireless sensor network to at least one device outside of the wireless sensor network. The routers in the wireless sensor network may each have a hop count that indicates a number of routers through which communications from the router pass to the gateway, and routers with a lower hop count may have a larger battery capacity than routers with a higher hop count.

These and other aspects of the invention will be apparent from the following description and claims.

BRIEF DESCRIPTION OF THE DRAWINGS

Aspects of the invention are described below with reference to the following drawings in which like numerals reference like elements, and wherein.

DETAILED DESCRIPTION

Aspects of the invention are described below with reference to illustrative embodiments. However, it should be understood that aspects of the invention are not limited to those embodiments described below, but instead may be used in any suitable system or arrangement.

Figure 1:
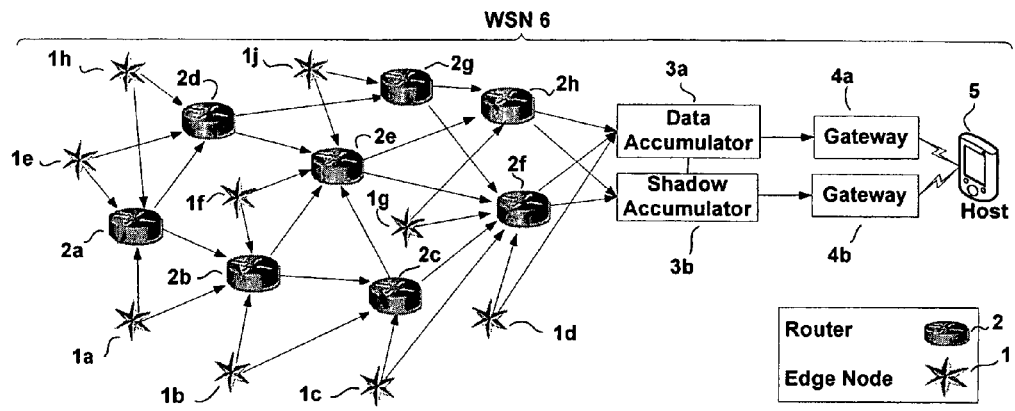
FIG. 1 shows an example of a wireless sensor communication network (WSN).

Aspects of the invention are described in relation to a wireless sensor communication network (WSN) 6, in which routing and non-routing devices may be combined into a mesh or hierarchical structure, as shown, for example, in the illustrative embodiment of FIG. 1.

As shown in FIG. 1, WSN 6 components may include:

Edge Nodes. Edge Nodes 1 may include small, battery-powered wireless radio transceivers that may provide low-bandwidth wireless connectivity for attached devices such as sensors (e.g., temperature, humidity, power or fuel consumption) and actuators (e.g., fans, LEDs, switches). Within the mesh or hierarchical structure of a WSN 6, Edge Nodes 1 may have parent nodes through which the Edge Nodes 1 may send and/or receive data; an Edge Node 1's parent may be a Router 2, a Data Accumulator 3, or a Gateway 4. Edge Nodes 1 may report data periodically, such as once a day, and may sleep for extended periods of time to reduce battery consumption. Edge Nodes 1 may communicate via a WSN 6, but may not expend power supporting other devices within the WSN 6 (i.e., Edge Nodes 1 may not serve as parents, only as children).

Routers. Routers 2 may be specialized nodes that self-organize into a WSN 6 backbone. Routers 2 may repeat or route the data transmitted on the WSN 6. They may transmit or relay messages to other nodes on the network, including Edge Nodes 1, Routers 2, Data Accumulators 3, or Gateways 4. A Router 2 may also be configured to collect and report its own sensor readings periodically, in addition to forwarding network traffic on behalf of other nodes. Routers 2 may also have parents; a Router's 2 parent may be another Router 2 or a Data Accumulator 3. Routers 2 may expend more power than Edge Nodes 1, as energy may be required to maintain network connections and to forward traffic on behalf of other devices. Nonetheless, a Router 2 may still operate for years on a small battery as shown herein. Alternatively, Routers 2 may be line powered.

Data Accumulators. A Data Accumulator 3 may accumulate data readings from devices in the WSN 6. The Data Accumulator 3 may be at the root of the WSN's 6 network tree. A Shadow Accumulator 3b, located near the Data Accumulator 3a, may be integrated with the Data Accumulator 3a and may serve as a backup by mirroring the data collected by the Data Accumulator 3a. Each Data Accumulator 3 may be connected through a serial, network, bus, or other connection to a Gateway 4, which in turn may pass data to an enterprise application.

Gateways. Gateways 4 may be mechanically similar to Routers 2, except that, in place of re-transmitting messages, they may provide an interface to a different physical or logical network. Gateways 4 may serve as portals to different types of networks, terminating the WSN 6 protocol and translating communications to a different protocol appropriate for the new network. Alternatively, a Gateway 4 may act as a bridge, encapsulating WSN packets in another protocol such as TCP/IP. Gateways 4 may be configured for networks such as Ethernet, WiFi, cellular, RS232, BACnet, LonWorks, or even simply binary switch outputs. In some configurations, Edge Nodes 1 and/or Routers 2 may connect directly to Gateways 4, providing a real-time connection to remote devices.

Host. A Host 5 may operate on a computer running Windows, Linux, or another environment suitable for the particular application. A Host 5 may include Host Software, which may provide an interface to the WSN 6, direct data into a database, or offer GUI applications that may present data, allow actuation (if applicable), or support network administration. In one embodiment, as shown in FIG. 1, the Host 5 may operate on a handheld device. In such an embodiment, the handheld device may support a walk-by scenario, wherein a handheld device may communicate with a Data Accumulator 3 via a Gateway 4 to extract the network's data. This scenario is discussed in more detail below.

Cluster head. A cluster head is any device, such as a Router, Data Accumulator or Gateway, that can act as a parent of all descendents in a WSN 6.

A WSN 6 may be designed to support hundreds of devices reporting daily. The WSN 6 may support only Routers 2 or permutations of Routers 2 and Edge Nodes 1 as appropriate for different applications. System capacity may primarily be limited by the battery life of Routers 2 close to Data Accumulators 3, as such Routers 2 may need to expend power passing traffic to and from a large number of more distant devices. System capacity may be increased with larger batteries on such Routers 2.

In this specification, "node" or "device" may refer to an Edge Node 1, Router 2, or other networked device. Within the system, Routers 2 and Edge Nodes 1 may have parent-child relationships, with Edge Nodes 1 being children of one or more Router 2 parents. Each Edge Node 1 may have a primary parent Router 2 and, if possible, a secondary parent Router 2 and even additional parent Router(s) 2 for redundancy. Similarly, Routers 2 may have parent-child relationships with other Routers 2. Data Accumulators 3 and/or Gateways 4 may also act as parents.

WSNs in an Automated Meter Reading (AMR) Application

In this discussion, we use as an example a WSN 6 that is configured for automated meter reading (AMR), such as might be provided by a business billing customers for heat, electricity, or water usage. In an AMR application, for example, a Heat Cost Allocator may measure the temperature of a radiator and from that may estimate a customer's energy usage. Similar calculations may be performed with water usage, using a low-powered or self-powered water meter designed for that purpose. The calculation of energy or water usage may be accumulated on the device itself, and a cumulative reading may be reported periodically (such as daily). Readings may be transmitted to a central collection point and then may be sent to an enterprise application. Information may also be displayed locally, such as on an LCD, at the press of a button.

The SensiNet AMR design may be a variant of Sensicast's Distributed Frequency Spread Spectrum (DFSS) design, as described in PCT Application WO05/010214 Method and Apparatus for Wireless Communication in a Mesh Network. For power savings on the Router, a single frequency or small number of frequencies may be used, particularly for control channels used to advertise Router timing and availability.

Although a WSN 6 configured for AMR is used as an example in this discussion, descriptions within are purely illustrative and are not intended to be limiting.

For the AMR application example described herein, we assume a design goal for Routers 2 is to run on battery power, with 10 year battery life at 1000 mAh. A one-day reporting interval may be sufficient, as long as daily reporting is reasonably reliable.

For the AMR application example described herein, we illustrate the design with a hypothetical but typical RF transceiver with the following general characteristics:

An integrated microprocessor with 32 kb flash, 4 kb SRAM, and power/timer features similar to MSP430. Some of the flash and minimal SRAM may be used for specific applications, such as for AMR.

2 µA power consumption with radio & microphone asleep. 2 ms wakeup at 4 mA power consumption.

250 kbit/s radio bandwidth, such as can be found with 802.15.4 radios or various proprietary transceivers.

20 mA receive, 25 mA transmit power consumption.

The different types of devices in a WSN 6 are discussed in more detail below.

Routers

A Router 2 may participate in the formation and operation of the network backbone. It may normally include a sensor and/or actuator and may also relay data from nearby devices. Routers may work together to form a redundant tree topology leading to a Data Accumulator 3. The tree may be redundant; each Router 2 may have multiple parents. Two parents per Router 2 are shown in FIG. 1; more than two parents per Router 2 may be supported by the software. The illustrative power calculations in this disclosure are based on three parents per Router 2.

A Router 2 may transmit a beacon once each minute on a randomized but predictable schedule. This beacon may allow other nodes to find (e.g., by listening for) the Router 2 and synchronize their timing with the Router 2. When a node becomes the child of a Router 2, it may lock onto the Router 2's beacon schedule, and may read the Router 2's beacon every few minutes to stay synchronized. A node with multiple parents may stay time synchronized with all of its parents. Aspects of the invention related to clock synchronization or other time management techniques are discussed in more detail below.

After each beacon, the Router 2 may wait for a short period of time to allow its children to direct a message toward the Data Accumulator 3. If a Router 2 receives a message from one or more of its children, it may repeat this message to all of its parents. Messages between a Router 2 and its children may be acknowledged. A child may send a message multiple times to its parent, within reason, until the message is acknowledged.

Router 2 memory may be very limited, so only a few messages may be buffered in Router 2 memory. A Router 2 may retain messages from its children only long enough to direct those messages toward the Data Accumulator 3 and/or Gateway 4.

Messages may be sent from a child to a parent during a "contention access period" immediately following the parent's beacon, or at other times that may be scheduled at predictable times in relation to the beacon. The parent/child protocol for a contention access period may be similar to that described in the specification for the IEEE 802.15.4 MAC. With a beaconing interval of about once per minute, the system may have a latency of about one minute per hop.

Routers 2 may also buffer a limited number of messages from a Data Accumulator 3 and/or Gateway 4 to its children, constrained by the limited memory available in the Router 2. A message may be addressed to a specific child device, or it may be addressed to all devices. Indicators of store and forward messages may be included in each beacon, or the message itself may be included in each beacon.

The power draw for a Router 2 is estimated in Table 1. The estimates in Table 1 utilize calculations from Tables 4 and 5 in the Appendix.

TABLE 1

Power estimates for Routers.

| Activity | mAh/year | Comments/Assumptions |
|---|---|---|
| Sensor Power | 10 | |
| Sensor Report | 0.05 | This assumes that sensor readings are reported once per day, to all three parents, with acknowledgements and retries. |
| Route Child Messages | 25.6 | This power estimate assumes the worst case scenario, wherein a Router must relay messages from 500 descendents once per day. |
| Sleep current | 17.5 | This estimate assumes a 2 µA power draw when the device is asleep. |
| Beacon | 5.9 | This assumes one 30-byte beacon transmitted each minute. This calculation allows a short time after each beacon to wait for incoming message from children before going back to sleep. |
| Keep-Alive | 19.5 | This assumes that Routers check for a message from each of their parents every two minutes. This also assumes that Routers simultaneously resynchronize their clock offset to each parent and that parent-child clocks can be cross-calibrated with 25 ppm accuracy. |
| Network Scans | 8.3 | In order to join the network initially, a node may run its receiver for a minute to scan for beacons from all of its neighbors. This may enable the node to find and select the best parents. Beacons may include a measure of link quality from the Router back to the Host, thereby enabling devices to pick the best parents. Routers may rescan for parents periodically. The power estimate assumes that a scan is performed every two weeks by each device for the life of the network. |
| Total | 86.9 | This estimate corresponds to 11.5 year battery life from a 1000 mAh battery. |

The numbers in Table 1 incorporate very conservative assumptions. In particular, an average of three acknowledged transmissions (i.e., one message and two retries) to each of three parents for each link is assumed.

Sensitivity analysis shows that power consumption as shown in Table 1 may be particularly susceptible to the following variables:

Data Rate: For our calculations, a 250 kbit/sec radio is assumed. Power requirements may roughly double if the radio rate is reduced to 76 kbit/sec.

Clock Skew: Clocks may be synchronized, with Routers 2 and their children waking up at (approximately) the same time. Drift in the clock crystal may require that child devices wake up earlier and listen longer, so that they may be sure of hearing a beacon at the appointed time. There may be small timing variations from crystal to crystal. In addition, crystal timing may change with temperature, age, and other effects, which may result in additional clock drift. Adjustments for each of these factors are discussed below.

The power estimate assumes that crystals may be calibrated to within 25 ppm for each parent-child pair. This may involve tracking node temperature, as well as automatically calibrating clock skew between devices. If performance may be calibrated to within 10 ppm, Router 2 battery life may be increased by about 8%. Conversely, calibration to within 50 ppm may decrease Router 2 battery life by about 12%.

Sleep Current: Sleep current may be capped at 2 µA so as not to decrease battery life. If sleep current is doubled, Router 2 battery life may be decreased by about 17%.

As noted earlier, a WSN 6 may be designed to support hundreds of devices reporting daily. Some Routers 2 may need to expend power passing traffic to and from a large number of more distant devices. For example, Routers 2 at the root of the network (near the Gateway 4) may pass messages to and from nearly every other node in the network, whereas Routers 2 at the edges of the network may need to pass messages to and from only a small number of descendents. Thus, Routers 2 nearer the root of the network may expend more power to service their descendents than may Routers 2 with a smaller number of descendents. Longer contention access periods may be needed for Routers 2 with more descendents. Thus, system capacity may be increased with larger batteries on Routers 2 with a large number of descendents.

Optimizations may be implemented to improve Router 2 battery life. For example, as noted in entry G3 of Table 5 in Appendix A, messages may be combined on heavily used Routers 2, thus decreasing the power required to service children by 50% (for example).

Clock Synchronization

Prior Sensicast specifications such as those described in PCT Application WO05/010214 describe how nodes may synchronize with their parents by listening for messages (called "beacons") from Routers 2 (or Data Accumulators 3) that have already joined the network. A beacon may be a very short message (on the order of two milliseconds) that may signal the availability of a Router 2 for communication, broadcast a synchronized time base, and/or transmit scheduling information for future beacons so that other nodes may predict the availability of a given Router 2 for communication, so that sleep periods may be synchronized. With precise synchronization, nodes may lessen the amount of time they spend awake listening for beacons, and may thus improve their battery life.

Each Router 2 may transmit a beacon periodically, such as once per minute. New nodes may search for parents by listening for the full beacon interval (e.g., for one minute), and then may track the timing of those parents by listening periodically to subsequent beacons (e.g., every 15 minutes).

The beaconing strategy may be essentially as described in PCT Application WO05/010214. Beacon timing may be randomized to prevent repeated collisions, such as once per minute ±0.5 second (randomized). The randomization schedule may be known and anticipated by the Router's 2 children, based on information included with the beacon, so that children may predict when their parents may be available for communication. The beacon may signal a Router's 2 availability for communication. The beacon may include information about the time base of the WSN 6, so that children may synchronize with their parents. The beacon may also include information about when to expect future beacons, so that child nodes can go to sleep and wake up based on when their parents are next expected to be available for communication.

A Router 2 may select the timing of beacons, as well as the channel on which they are transmitted at a given time, through a combination of user configuration and adaptive algorithms. The timing and channel of beacons may be regular and pseudorandom. For example, a Router 2 may be set to send a beacon every 60 seconds, with a randomized dither of plus or minus 0.500 seconds. The randomized dither may be calculated using a linear congruential generator of the form in Equation 1:

$$R_{n+1} = (a \cdot R_n + b) \bmod m \quad (1)$$

The values a (the multiplier), b (the increment), and m (the modulus) are pre-selected constants. The choice of constants is well studied in the computer science literature.

Transmission of the value $R_n$ with each beacon may allow a node to "lock on" to the Router's 2 pseudorandom number sequence. This in turn may be used to forecast the timing of future transmissions, thus allowing the node to wake up and sample the channel at the time a transmission is expected.

Alternatively, and for less computational complexity, the dither may be derived from a lookup table that is shared across the network.

These two techniques may be combined, with a linear congruential generator used to generate a table of a sequence of x pseudorandom numbers. A device wishing to duplicate the table and synchronize with the Router 2 may need the pseudorandom seed used to generate the table, the table length, and the current offset into the table.

For example, a node may use a seed in a linear congruential generator to generate a table of 32 pseudorandom numbers. Each of the table entries may be taken as a dither amount. For example the low-order 10 bits may be used to set the dither in milliseconds, resulting in a dither of ±512 milliseconds (approximately ±0.5 seconds). Thus a Router 2 may send a beacon every minute±a randomized dither from the table. In this example, the true time period to cycle through a table of 32 entries would be 32 minutes±(sum of all 32 randomized dithers).

However, as noted earlier, drift in the clock crystal may require that child devices wake up earlier than the expected beacon time and listen longer, so that they may be sure of hearing a beacon at the appointed time. There may be small timing variations between crystals, and temperature changes may result in additional clock drift. It may be desirable to adjust for these effects, so as to minimize child device wakeup time and thus to prolong battery life. Adjustments for temperature effects and fixed clock skew are discussed below.

Adjusting for Temperature Effects

As noted earlier, power consumption may be fairly sensitive to the degree of time synchronization between the parent and child, which in turn relies on clock accuracy.

Temperature may change the timing characteristics of crystal oscillators. It is possible to buy TCXOs (temperature compensated crystal oscillators) that provide highly accurate timing across a range of temperatures; however, this may involve some cost and may use more power than is desirable. TCXOs may also provide more precision than may be necessary; as noted earlier, the power estimates for the SensiNet AMR design assume 25 ppm accuracy, and TCXOs may achieve much better than 25 ppm accuracy.

A design guide from chip manufacturer Microchip Technology Inc. (PICmicro Microcontroller Oscillator Design Guide AN588, available at http://ww1.microchip.com/downloads/en/AppNotes/00588b.pdf) provides an overview of the issues with various types of timers. The guide describes a formula that estimates how timing may change with temperature in a 32 kHz crystal of the type typically found in an inexpensive WSN 6 device. A formula for temperature-dependent frequency change (in ppm) is given in Equation 2 as:

$$0.04 * ((25 - °C.)^2) \quad (2)$$

A similar formula may be used by a WSN 6 device to compensate for timing that drifts based on the device's own temperature.

In accordance with one aspect of the invention, a baseline approach for a device with a 32 kHz clock (actually specified as 32.768 kHz in a typical crystal) may be as follows:

The device may be scheduled to wake up at some precise time (e.g., after the passage of a determined time period since a last wake up event), such as one minute plus a randomized fraction of a second.

The wakeup time may be calculated based on the standard performance of the clock at 25° C.

Figure 2:
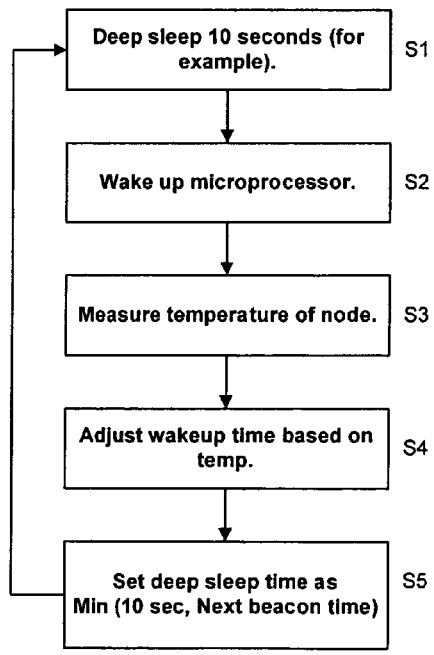
FIG. 2 illustrates an algorithm for clock synchronization between beaconing events, adjusting for temperature.

A device may use a method such as that shown in FIG. 2 to control its sleep/wake cycle, according to which a device may go into a deep sleep for 10 seconds in step S1. After a time period of 10 seconds elapses, the device may wake up in step S2, read its temperature S3, and adjust the planned wakeup time to account for temperature effects over the prior 10 seconds in step S4. While the formula in Equation 2 may be used to adjust the elapsed time measured by the clock in step S4, a more accurate result may be achieved by profiling a representative sample of devices and placing an appropriate offset value in a table for a given set of temperatures. Adjustment made in step S4 may be to the elapsed time measured by the clock (e.g., by multiplying the elapsed time by a suitable factor, and then comparing the adjusted elapsed time to the time period over which the device is to sleep), or to the expected time period (e.g., by multiplying the expected sleep time period by a suitable factor and comparing the adjusted expected time to the elapsed time measured by the clock). After step S4, the device may set a deep sleep time for another 10 seconds (or longer or earlier if required to wake up for a beaconing event) in step S5, and may return to a deep sleep, allowing control to jump back to step S1.

For example, the following process may be used to adjust a device's wakeup time period, e.g., the time period between events of beacon transmission or reception:

A device at 50° C. may be expected to drift by 25 ppm specifically due to temperature effects, as calculated by formula or looked up in a table (as described above). A drift of 25 ppm corresponds to 250 microseconds every 10 seconds.

Each clock tick at 32.768 kHz corresponds to approximately 30.5 microseconds per tick. Thus, an adjustment of approximately 8 clock ticks over the 10-second period may roughly compensate for the temperature effect of the clock drift. (8 ticks*30.5 microseconds=244 microseconds per 10-second period)

Thus, if a device wakes up after 10 seconds and measures its temperature as 50° C., it may adjust all of its future 10 second sleep periods by 8 clock ticks (plus a fraction that may be accumulated, dependent on implementation).

In a table-driven approach, a mapping between temperature and clock adjustment may be determined empirically for a particular design. Multiple such tables may be used to account for a variety of device profiles. For example, an aged (older or more heavily used) device may have a different set of offsets than a new device, or a device that is experiencing an increase in temperature may have a different profile than a device experiencing a temperature that is stable or decreasing.

Using these techniques, each device on the network may compensate for clock drift as a function of the device's own temperature.

A node's sensor (such as a temperature sensor) may be read and results accumulated every few seconds, in conjunction with clock drift correction. Alternatively, or additionally, a node's sleep cycle may be interrupted by asynchronous sensor events such as the rotation of a water meter.

Adjusting for Fixed Clock Skew

In another aspect of the invention, adjustment may be made for a fixed clock skew that may vary from one device to another, more or less independent of temperature effects. Such adjustment may be performed in conjunction with adjustment for temperature effects, or in the absence of temperature effect compensation. In the SensiNet AMR design, a key purpose of time synchronization may be to ensure that a child node is listening at exactly the time that its parent is scheduled to transmit a beacon. For this limited purpose, it may not be necessary for a device to calibrate the skew of each individual device; rather, the relevant metric may be the sum of the fixed skew for each parent-child relationship, since a device may need to measure only how much its own clock has drifted in relation to its parent's clock drift. This may be measured by child (or parent) devices as described below.

For example, a child node may forecast that one of its parents will beacon in 15 minutes and 3.173 seconds (here noted in the form 15:03.173) in the parent's time base. If the child finds that the beacon actually occurs in 15:03.212 in the child's time base, then the child may calculate a relative clock skew between the parent and child of 0.039 seconds over a 15-minute period. If the next synchronization time is forecast in 15:07.263 in the parent's time base, then the child may apply a fixed offset of 0.039 seconds (or other suitable offset) to forecast a wakeup in 15:07.302 in the child's time base. Such offsets may be averaged, for example to account for the last ten readings. If the fixed clock skew changes with age, this may be accounted for automatically with an approach that is biased in favor of recent data.

Tables 4 and 5 in Appendix A show a calculation to account for Keep-Alive "listening." This simplified calculation assumes that the maximum uncalibrated clock drift is 25 ppm, and also assumes that a node's receiver is always turned on early enough to hear the beacon. In practice, more adaptive approaches may be used.

Taking the example of the Edge Node 1 Keep-Alive, Table 5 assumes that a node wakes up for a time period of 23.46 ms each 15 minutes. This provides an estimate for making broad design trade-offs, but the actual algorithm that results in this average use of power may work as follows, as shown in the flow chart of FIG. 3:

After reading a parent's beacon, a child may calculate the beacon time of the parent approximately 15 minutes from now based on the parent's randomized beaconing formula in step S10 and initialize a listening time (a time period while awake that the child listens for the parent's beacon) in step S11. The child may adjust for previously measured fixed clock skew between child and parent (e.g., add or subtract an offset to an elapsed time period measured by the clock or to the expected sleep time period) in step S12.

The child may sleep for the 15-minute period minus a fraction of the listening time in step S13, e.g., incrementally adjusting its internal clock periodically (such as every 10 seconds) to account for temperature as shown in FIG. 2.

At the end of the period, the child may listen for the parent for 10 milliseconds in step S14.

If the parent is not heard, control flows to step S19 in which the child increases the listening time (e.g., to 20 milliseconds) according to a lookup table or by using another technique. In step S20, a determination is made whether all values in the lookup table have been used, and if so, it is assumed in step S22 that the parent is lost and the child will stop listening for the parent. If not, in step S22, a new wake up time is determined for the parent's next beacon, and control jumps back to step S12.

If the parent is not heard in subsequent listening times, the child may continue increasing the listening time in step S19 until the system falls outside of a previously determined "reasonable" range in step S20 (e.g., values in the lookup table are exhausted). In the example shown in Table 2, a 50 ppm drift for 20 minutes may result in a 60 ms offset. If it is known (from empirical study) that ±50 ppm is the worst case drift, then failure to detect a parent multiple times on the expected schedule may be taken as reasonably compelling evidence that the parent has stopped reporting on schedule. In the case where all table entries have been used, then the child may assume that its parent is lost and may attempt to rejoin the network after step S22 (not shown). The decision of whether to search for a replacement parent may depend on the quality of the links that remain; for example, if a node has three parents and loses one, it may not be necessary for the node to rejoin the network, as it may have two remaining parents available for communications.

TABLE 2

Example of reasonable listening range.

| Time | Duration of listening | Offset from forecast |
|---|---|---|
| 15 minutes | 10 ms | −5 ms |
| 16 minutes | 20 ms | −10 ms |
| 17 minutes | 40 ms | −20 ms |
| 18 minutes | 80 ms | −40 ms |
| 19 minutes | 120 ms | −60 ms |
| 20 minutes | 120 ms | −60 ms |

(This is only an example. If this kind of drift is possible in the worst case, a more frequent keep-alive scan may be a more appropriate power saving strategy. Actual parameters may be selected based on an understanding of device performance and application requirements.)

In step S14, if the parent is heard, the child may determine whether the beacon includes a message or message indicator for itself in step S15. If it does, then the child may process the beacon and/or request additional information from the parent in step S16. The child may then report data as required by the application in step S17.

Once the correct offset is found, the offset may be applied to the next expected beacon in step S18. For example, if an actual offset of +57 ms is detected at 19 minutes, this 3 ms/min offset may be incorporated into the skew calculation for the subsequent sleep period.

One technique that may be used to calculate the offset may be a formula of the form in Equation 3:

$$\text{OffsetMovingAverage} = ((1-X) * \text{OffsetMovingAverage}) + (X * \text{OffsetNow}) \quad (3)$$

where X may be a value such as 0.25 and where the initial state of OffsetMovingAverage may be 0. With this approach, old values decay exponentially.

Figure 3:
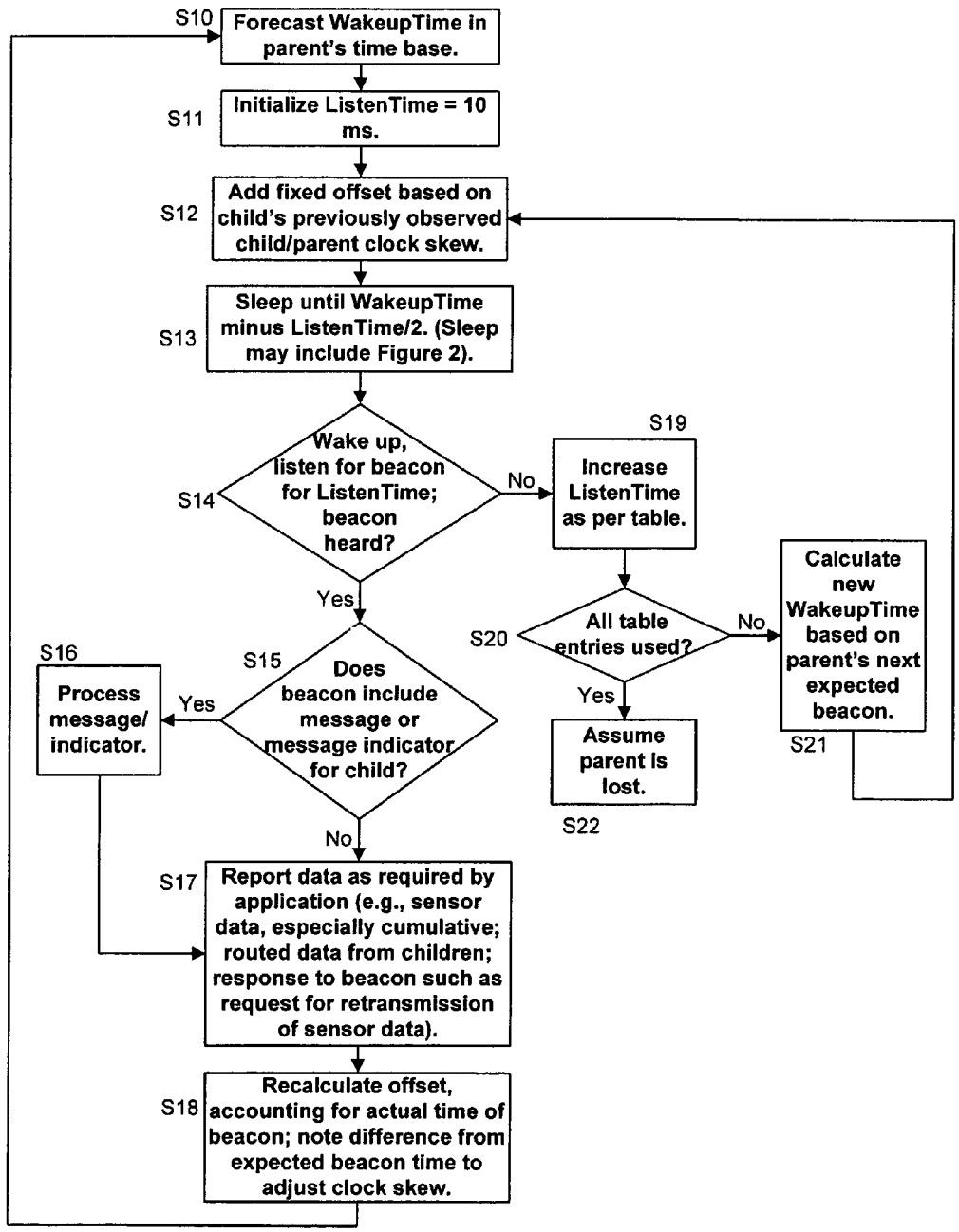
FIG. 3 illustrates an algorithm for child node synchronization to parent, adjusting for clock skew.

FIG. 3 shows an example of a child tracking a single parent. This may be extended to track multiple parents (or children) simultaneously, by essentially running the process in parallel for multiple parents (or other devices). Similarly, FIG. 2 shows the time adjustment for a single beacon event; this may be simultaneously applied to the beacon tracking process for each of a node's parents or children, along with the beacon timing for a Router's 2 own beacons.

Router Messages in SensiNet AMR

In the typical SensiNet WSN 6 implementation, Routers 2 may keep track of their children and may have various buffers reserved for each child. The SensiNet AMR design may not require that Routers 2 know the identities of their children; a Router 2 may simply pass any message from any child toward the Data Accumulator 3. This simplification may dramatically reduce program size and memory requirements.

Figure 4:
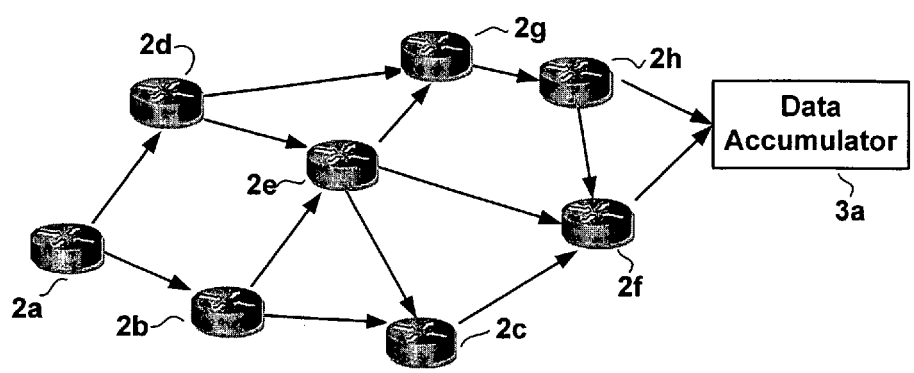
FIG. 4 illustrates an example of hierarchical routing.

While the primary flow of messages may be toward a Data Accumulator 3, there may be applications requiring messages (such as NACKs) originating from the Data Accumulator 3 be sent to a specific Router 2 or Edge Node 1. If simplified Routers 2 lack a picture of the rest of the network, other methods are still available for sending messages to a node:

The Data Accumulator 3 may build a hierarchical picture of the network in its memory, and may use this picture to rout messages explicitly. The hierarchical picture may be based on periodic reports from nodes identifying their parents. Thus, the Data Accumulator 3a in FIG. 4 may determine, based on periodic reports from the Routers 2, that Router 2a is a child of Router 2d, 2d is a child of Router 2g, and 2g is a child of Router 2h. In this example, the Data Accumulator 3a may then send a message to 2a of the form 2h (2g (2d (2a))). Router 2h may remove the message header for 2h and may pass on a message 2g(2d(2a)), and so forth until the message reaches Router 2a.

If messages are infrequent, they may be broadcast so that they are referenced or included within the beacons for a period of time and eventually received by all nodes. A sequence number included with the beacon, and repeated in the receiving node's next sensor report, may serve as an acknowledgement.

Long addresses, such as 64 bits long, may be assigned to devices at manufacture, but short addresses, such as 16 bits long, may be desirable within the WSN 6 for shorter packets and thus higher power efficiency. When a Data Accumulator 3 first hears from a node with a long ID, it may respond by sending to the node a short ID for use within a particular session.

Forming the SensiNet AMR Network

When a node is powered on, a device may validate that it found the network, such as by flashing an LED. During normal network operation, it may take some time for a Host 5 computer to be notified that a node has joined the network. However, local feedback may be needed quickly, so that an installer may know within a short time, such as within a minute or so, that the node has found the network.

Figure 5:
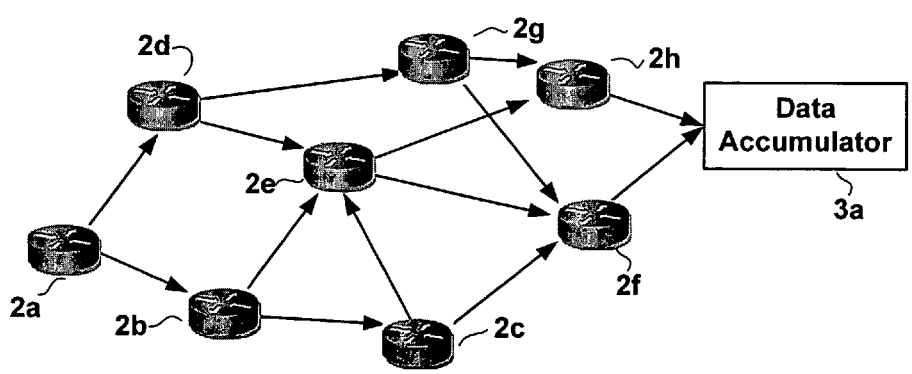
FIG. 5 illustrates an example of Router structure in a WSN.

FIG. 5 shows a Router 2 structure that may form the backbone of a SensiNet AMR network as shown in FIG. 1. Prior Sensicast specifications such as PCT Application WO05/010214 describe how this backbone may be built. First, the Data Accumulator 3a may transmit beacons that may be heard by nearby nodes; these nodes may join the network with a hop count of 1 (that is, these nodes may be one hop from the Data Accumulator 3a), and then may send their own beacons.

In one implementation, all Routers 2 may be continuously powered. In that scenario, Routers 2 may be installed before the Data Accumulator 3 is installed, and Routers 2 may simply monitor control channels until they hear beacons from Routers 2 that are already connected to a Data Accumulator 3.

Edge Nodes 1 that are battery powered may need to be more selective in their use of power. If they fail to hear beacons when they are first powered, they may go to sleep and may look for beacons only infrequently. The sleep interval may constrain startup time on battery powered devices.

In the SensiNet AMR implementation, Routers 2 may be battery powered, and it may not be realistic to expect that Routers 2 will always be installed at increasing distances from the Data Accumulator 3. This may involve some changes to the method of SensiNet network formation in order to save power. Routers 2 and Edge Nodes 1 may be configured to form clusters of intercommunicating devices, thus sharing a time base and beaconing schedules for low-power operation. When Data Accumulators 3 attach to such clusters, these clusters may, at a future time, be reorganized to direct traffic toward the Data Accumulators 3. In this way, Routers 2 may not need to search continuously for neighbors, and Edge Nodes 1 may attach efficiently to nearby Routers 2 even if a functional data collection network has not yet been formed.

Figure 6:
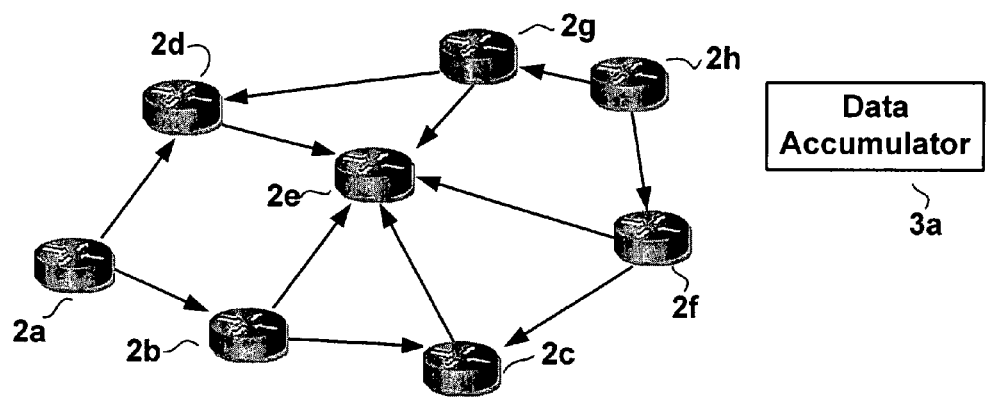
FIG. 6 illustrates how a network might form around the first Router to join a WSN.

FIG. 6 shows an alternative design in accordance with one aspect of the invention. For this example, assume that Router 2e was the first Router 2 installed. When it starts, Router 2e may seek beacons for one minute, and when it hears none, it may start beaconing itself. The beacon may essentially say, "I'm here, but I didn't find a network."

Upon installation, as shown in FIG. 6, Routers 2b, 2c, 2d, 2f, and 2g may all hear these beacons and may become children of Router 2e, forming a cluster. Routers 2a and 2h may also join this cluster upon installation. All of these devices may beacon their presence, with an indication that they have not joined a WSN 6. This cluster of devices may not be a functional network yet in the sense that it may not be connected to a cluster head, such as a Data Accumulator 3, and as such there may be no place to send data from the devices. However, the cluster may provide a means for newly introduced nodes to find nearby Routers 2 and for collections of such nodes efficiently to remain time synchronized to one another. Such devices may assign themselves random temporary short addresses. It may be quite unlikely that two nearby devices may share both a common random short address and a beaconing schedule, and since no information may be transmitted through these devices, no harm may be done by assigning themselves short addresses. A network address, for the purpose of identifying a node to the Data Accumulator 3, may be assigned later by the Data Accumulator 3 when it forms a network from a cluster of devices.

Figure 7:
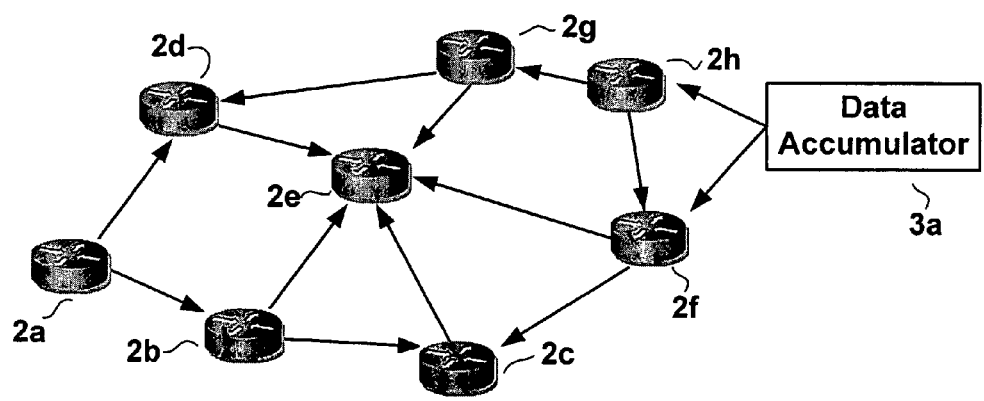
FIG. 7 illustrates a Data Accumulator being added to the WSN of FIG. 6.

As shown in FIG. 7, when a cluster head, such as a Data Accumulator 3a, is first powered on, it may listen for beacons from other devices. It may hear beacons from Routers 2h and 2f and may "join" the network as a child of 2h and 2f. (This step may be virtual.)

Figure 8:
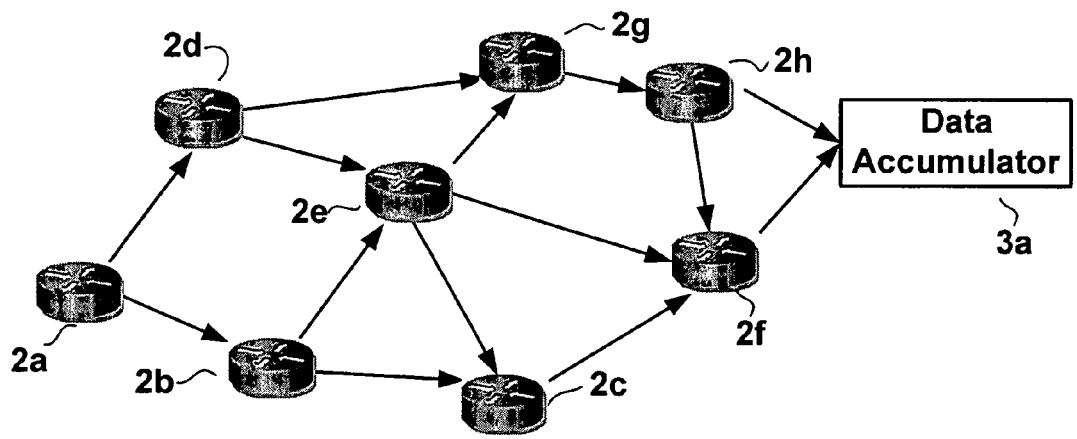
FIG. 8 shows the Data Accumulator adjusting parent/child relationships within the WSN of FIG. 6.

As shown in FIG. 8, the Data Accumulator 3a may then command its "parents" 2h and 2f to become its children with a hop count of 1. Routers 2h and 2f may in turn command their parents Routers 2c, 2e, and 2g to become their children with a hop count of 2. Finally, Routers 2c and 2g may command their parents Routers 2e and 2d to become their children with a hop count of 3. (Note that, in this example, Router 2e may receive requests from three parents. If a Router 2 receives too many such requests, it may have to refuse some of them.) Routers 2a and 2b, without changing parents, may eventually discover (through beacons that are read during their periodic Keep-Alive scans) that their parents have joined a network, and may adjust their hop counts and short addresses accordingly without changing parents.

This scheme has the potential to create circular references. A Router 2 may detect circular references by receiving the same message twice. A Router 2 may also detect a circular reference by detecting a path to the Host 5 that includes the Router 2 itself. The Host 5 may also detect circular references by noting when a Router 2 has itself as a descendent. When a Router 2 detects a circular reference, the Router 2 may attempt to rejoin the network.

Similarly, when the Host 5 detects a circular reference, it may instruct the Router 2 to rejoin the network. This may remove the Router 2 from the current path. The Router 2 may then become the child of another Router 2, creating a new path that does not include a circular reference. To prevent the occurrence of circular references, Routers 2 may be instructed to reject paths that contain themselves (i.e., devices may include instructions not to become children of their own children).

Edge Nodes

An Edge Node 1 may essentially be the same as a Router 2, except that it may not route traffic on behalf of other devices. Therefore, an Edge Node 1 may not need to expend power transmitting beacons or responding to its children. This may allow Edge Nodes 1 to run longer or to utilize smaller batteries.

The power draw for an Edge Node 1 is estimated in Table 3. The estimates in Table 3 utilize calculations from Tables 4 and 5 in the Appendix.

TABLE 3

Power estimates for Edge Nodes.

| Activity | mAh/year | Comments/Assumptions |
|---|---|---|
| Sensor Power | 10 | |
| Sensor Report | 0.05 | This assumes that sensor readings are reported once per day, to all three parents, with acknowledgements and retries. |
| Sleep Current | 17.5 | This estimate assumes a 2 µA power draw when the device is asleep. |
| Keep-Alive | 14.0 | This assumes that Edge Nodes synchronize to their parents every 15 minutes and simultaneously resynchronize their clock offset to each parent. This also assumes that parent-child clocks can be cross-calibrated with 25 ppm accuracy. |
| Network Scans | 8.3 | This covers overhead to join the network, as described in Table 1. |
| Total | 49.9 | This estimate corresponds to 20.0 year battery life from a 1000 mAh battery. |

As with Routers 2, power consumption for Edge Nodes 1 may be particularly sensitive to data rate, clock skew, and sleep current. These factors may be adjusted for as previously described and as shown in FIGS. 2 and 3.

Data Accumulators

As shown in FIG. 1, Data Accumulators 3 may sit at the root of the network tree. A Data Accumulator 3 may act as the "final" Router 2, and may consume a similar amount of power as a normal Router 2. Data Accumulators 3 may perform the following functions for the network:

All data reports may be directed to the Data Accumulator(s) 3, which may archive cumulative daily readings from all nodes within the constraint of available storage.

A Data Accumulator 3 may note when a device has not reported as expected. If an expected report is missing, the Data Accumulator 3 may broadcast a "NACK" (negative acknowledgement, i.e., a notification that an expected message has not been received) through the network by exception, which may in turn be embedded in the network beacons. This may provide a low overhead form of end-to-end acknowledgement between an Edge Node 1 and the Data Accumulator 3.

Data reports may be forwarded from a Data Accumulator 3 to a Gateway 4 as required by an application.

In FIG. 1, two Accumulators 3, a main Data Accumulator 3*a* and a Shadow Accumulator 3*b*, are shown for redundancy, with a serial connection between them to enable data mirroring. This may provide redundancy in two ways:

During normal operation, a Shadow Accumulator 3*b* may provide a redundant radio link. In most cases, both Accumulators 3 may hear identical messages. However, under some multipath conditions, a link to one or the other device may be lost temporarily. A Shadow Accumulator 3*b* placed several wavelengths away may substantially reduce the rate and severity of such problems.

A Shadow Accumulator 3*b* may provide a data backup in the event of failure of the primary Data Accumulator 3*a*.

System capacity may be limited by the battery capacity of Routers 2 that are a small number of hops away from a Data Accumulator 3 or Gateway 4. Routers 2 with a large number of descendents expend energy transmitting information on behalf of other nodes, and more descendents may result in more traffic. To a certain extent, the system design may compensate by reducing the reporting frequency or combining reports into consolidated packets. But eventually, it will be necessary to transmit more data and/or to extend the Router's 2 contention access period to a point where the battery life goals cannot be achieved. For these situations, it may be necessary to provide larger batteries for Routers 2 that are near the Data Accumulator 3 or Gateway 4.

While it is generally desirable for all Routers 2 to be identical, it may be useful in certain situations to allow certain Routers 2 to be equipped with larger batteries. For example, a network of heat cost allocators and water meters may be installed in an apartment building, with all nodes being configured as Routers 2 for simplicity of installation. These devices may be configured to only accept a certain number of children and descendents. In addition, dedicated Routers 2 with larger batteries may be installed in the hallways as a network backbone, and allowed to establish a working network through the building before any sensors are deployed in the apartments. Due to the routing constraints of the sensor/routers, routes will tend to be directed toward backbone routers with larger batteries.

Gateways

As noted earlier, Gateways 4 may be mechanically similar to Routers 2, except that, instead of relaying messages, Gateways 4 may provide an interface to a different physical or logical network. Gateways 4 may terminate the WSN 6 protocol and may translate communications to a different protocol appropriate for the new network.

In FIG. 1, the Gateways 4 are shown as separate devices from the Data Accumulators 3, but in practice a Gateway 4 may be fully integrated with a Data Accumulator 3.

The Gateway 4 may need to support a walk-by scenario, wherein a handheld device may communicate directly with the Data Accumulator 3 to extract the network's data. A different radio may be appropriate for WSN 6 operation vs. a handheld link. For example, in Europe, the 868.0-868.6 MHz band has desirable characteristics for this AMR network design, but devices in this band are limited to a 1% duty cycle due to regulatory constraints. A 1% duty cycle may reduce the available channel from 250 kbps to 2.5 kbps. At 2.5 kbps, data payload throughput (accounting for communications and packet overhead) may be in the range of tens of bytes per second; at that speed, it may take an unacceptably long time to download data for a sizeable network from a Data Accumulator 3 to a handheld device.

Figure 9:
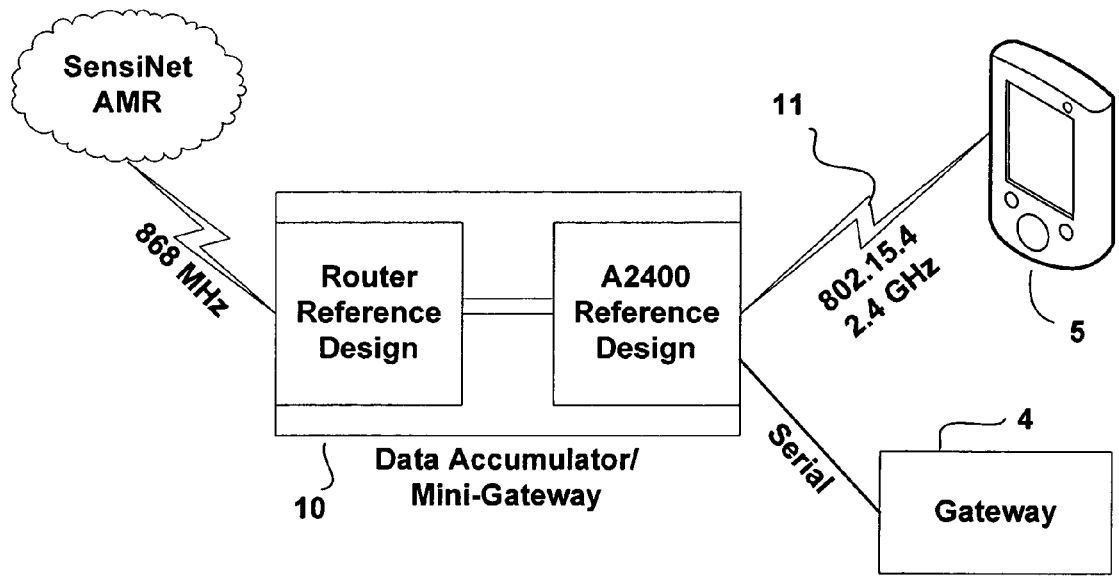
FIG. 9 illustrates a Data Accumulator design.

A reasonable alternative may be to include a 2.4 GHz IEEE 802.15.4 interface 11 within a Data Accumulator 3 as shown in FIG. 9, enabling the Data Accumulator 3 to operate as a Mini-Gateway 10 at 250 kbit/sec. A Gateway 4 based on the Sensicast OEM200 module may be used for this purpose. The OEM200 includes an IEEE 802.15.4 radio amplified to 15 dBm, 128K programming flash, 128K memory for data storage, and numerous interfacing options as supported by the Atmel AVR family of processors. A flexible memory and programming model may enable the implementation of a Shadow Data Accumulator 3, as well as potentially supporting a wide range of Gateway 4 interfaces. For a walk-by scenario, the built-in IEEE 802.15.4 radio may provide an inexpensive wireless interface to PDAs or other devices with 802.15.4 capability. In applications where an IEEE 802.15.4 radio is appropriate for the WSN 6, a single radio module may be used for both purposes.

For the SensiNet AMR application, the Mini-Gateway 10 may be battery operated, but the battery may be larger than 1000 mAh to provide power for the additional functionality of a Mini-Gateway 10.

In another configuration, the Mini-Gateway 10 may transfer data to another device that may provide Host 5 connectivity through cellular connection or other means. As in other configurations, the Mini-Gateway 10 may collect data, as a Data Accumulator 3 would, and may serve as an interface to a different physical or logical network, as a Gateway 4 would.

System Reliability

The illustrative power model used herein assumes an average of three acknowledged transmissions (the original transmission plus two retries) per link, with three parents per link. Each message may be sent to all three parents for redundancy. If a message does not get through to a Data Accumulator 3 (which may be an infrequent occurrence), the Data Accumulator 3 may notice that the node has not reported, and may send a NACK asking the message to be sent again. If the expected message does not arrive in response to the NACK, the Data Accumulator 3 may send another NACK, within reason. Due to memory constraints on the Routers 2 and other factors, there may be limited bandwidth upstream towards the nodes, but there may be enough capacity to NACK (for example) ten nodes per hour, in addition to periodic messages that are broadcast to all nodes. Ten nodes per hour may cover about 50% of a 500-node network over the course of a day. Thus, the system may provide the following levels of resiliency:

Three parents for each link for redundancy.

For each link, acknowledged communication with retries.

NACK from the Data Accumulator 3 when data is not reported on schedule, essentially providing end-to-end reliability.

Cumulative data reports, so that if one day's data is missed, it may be accumulated in the next day's report.

In this disclosure, we have described how data may be reported from device to device within a WSN. We have considered how data from a network of devices may be accumulated and passed to devices or applications outside the network. We have discussed some requirements for timely, low power communication within such WSNs, including methods of clock synchronization and network backbone formation. We have also addressed features that may be incorporated to improve system reliability. Again, the embodiments described herein are meant to be illustrative and are not intended as limiting. In addition, various features described above may be combined in any suitable way to form a system in accordance with the invention.

APPENDIX A

TABLE 4

Power calculations for WSN.

Model Parameters

| | | | |
|---|---|---|---|
| Bit rate | 250 | kbit/sec | |
| Transmit power | 25 | mA | |
| Receive power | 20 | mA | |
| Sleep current | 2 | uA | |
| Warmup time | 2 | ms | |
| Warmup current | 5 | mA | |
| Crystal drift | 25 | ppm | Calibrated pairwise |
| Beacon size | 30 | bytes | |
| Contention access period | 10 | bytes | Listen for children |
| Beacon interval | 1 | min | |
| Annual resynchs | 25 | | Periodically search for new parents |
| Router battery capacity | 1000 | mAh | |
| Edge node battery capacity | 1000 | mAh | |
| Network capacity | 500 | nodes | |
| Router keep alive interval | 2 | min | Check for parent messages |
| Edge node keep alive interval | 15 | min | Synchronize clock to each parent |
| Number of parents | 3 | | Primary, secondary, tertiary, etc . . . |
| Report interval | 24 | hours | |
| Report size | 32 | bytes | |
| Report retries | 3 | | Average number of retries per hop |
| Sensor power | 10 | mAh/year | |

Edge Node Power Draw per Annum (see Table 5 for detailed calculations)

| | | |
|---|---|---|
| Sensor power | 10.00 mAh | |
| Report | 0.05 mAh | Table 5 cell A10 |
| Sleep | 17.52 mAh | Table 5 cell B2 |
| Keep alive | 13.99 mAh | Table 5 cell D8 |
| Network resynch | 8.33 mAh | Table 5 cell F4 |
| Total | 50.00 mAh | |
| Battery life | 20.00 years | |

Router Power Draw per Annum (see Table 5 for detailed calculations)

| | | |
|---|---|---|
| Sensor power | 10.00 mAh | |
| Report | 0.05 mAh | Table 5 cell A10 |
| Sleep | 17.52 mAh | Table 5 cell B2 |
| Keep alive | 19.53 mAh | Table 5 cell E8 |
| Service children | 25.59 mAh | Table 5 cell G4 |
| Periodic beacon | 5.90 mAh | Table 5 cell C11 |
| Network resynch | 8.33 mAh | Table 5 cell F4 |
| Total | 70.00 mAh | |
| Battery life | 14.29 years | |

TABLE 5

Detailed power calculations for WSN.
Detailed Calculations

Comments and Formulas (using cell numbers on left)
(warmup_time & warmup_current taken from Table 4)

Edge Node Report

| | | | | |
|---|---|---|---|---|
| A1 | Report interval | 24 | hours | |
| A2 | Report size | 32 | bytes | |
| A3 | Transmit per report | 1.02 | ms | (A2 * 8)/C1 |
| A4 | Transmit power | 25 | mA | |
| A5 | Ack time | 1.02 | ms | Copied from transmit time A3 |
| A6 | Receive power | 20 | mA | |
| A7 | Number of parents | 3 | | |
| A8 | Average retries | 3 | | |
| A9 | Average draw | 0.00000584 | mA | (A7 * A8) * ((warmup_time * warmup_current) + (A3 * A4) + (A5 * A6))/(1000 * 60 * 60 * A1) |
| A10 | Draw per annum | 0.05117 | mAh | |

Sleep

| | | | | |
|---|---|---|---|---|
| B1 | Sleep draw | 2 | uA | |
| B2 | Draw per annum | 17.52 | mAh | B1 * 24 * 365/1000 |

Router Periodic Beacon

| | | | | |
|---|---|---|---|---|
| C1 | Bit rate | 250 | kbps | |
| C2 | Beacon size | 30 | bytes | |
| C3 | Time per beacon | 0.96 | ms | (C2 *8)/C1 |
| C4 | Transmit power | 25 | mA | |
| C5 | Beacon interval | 1 | minute | |
| C6 | Average draw transmit | 0.00056667 | mA | ((warmup_time * warmup_current) + (C3 * C4))/(C5 * 60 * 1000) |
| C7 | Listen window | 10 | bytes | |
| C8 | Listen time | 0.32 | ms | (C7 * 8)/C1 |
| C9 | Receive power | 20 | mA | |
| C10 | Average draw receive | 0.000106667 | mA | (C8 * C9)/(C5 * 60 * 1000) |
| C11 | Draw per annum | 5.90 | mAh | (C6 + C10) * 24 * 365 |

Edge Node Keep-Alive

| | | | | |
|---|---|---|---|---|
| D1 | Keep-Alive interval | 15 | min | |
| D2 | Crystal drift | 25 | ppm | |
| D3 | Crystal drift | 1.5 | ms/min | D2 * 60 * 1000/10000000 |
| D4 | Receive power | 20 | mA | |
| D5 | Receive time | 23.46 | ms | Accounting for crystal drift; C3 + (D1 * D3) |
| D6 | Average draw | 0.000532444 | mA | ((warmup_time * warmup_current) + (D4 * D5))/(D1 * 60 * 1000) |
| D7 | Parents to track | 3 | | |
| D8 | Draw per annum | 13.99 | mAh | D6 * D7 * 24 * 365 |

Router Keep-Alive

| | | | | |
|---|---|---|---|---|
| E1 | Keep-Alive interval | 2 | min | |
| E2 | Crystal drift | 25 | ppm | |
| E3 | Crystal drift | 1.5 | ms/min | E2 * 60 * 1000/10000000 |
| E4 | Receive power | 20 | mA | |
| E5 | Receive time | 3.96 | ms | Accounting for crystal drift; C3 + (E1 * E3) |
| E6 | Average draw | 0.000743333 | mA | ((warmup_time * warmup_current) + (E4 * E5))/(E1 * 60 * 1000) |
| E7 | Parents to track | 3 | | |
| E8 | Draw per annum | 19.53 | mAh | E6 * E7 * 24 * 365 |

Network Synch

| | | | | |
|---|---|---|---|---|
| F1 | Router beacon interval | 1 | min | |
| F2 | Receive power | 20 | mA | |
| F3 | Rescynchs per annum | 25 | | |
| F4 | Power per annum | 8.33 | mAh | F1 * F2 * F3/60 |

Service Children

| | | | | |
|---|---|---|---|---|
| G1 | Number of descendents | 500 | | |
| G2 | Power draw for each | 0.10 | mAh | Rough estimate -- twice Edge Node report (inbound and outbound); 2 * A10 |
| G3 | Optimization | 50% | | Combine messages on heavily used Routers |
| G4 | Power per annum | 25.59 | mAh | G1 * G2 * G3 |

The invention claimed is:

1. A method for coordinating communication in a wireless sensor network, comprising:

associating a first node with a wireless sensor network including at least two nodes associated with each other in a parent/child relationship, the first node being associated with the wireless sensor network such that the first node functions as a parent or child to at least one other node; and determining a wake up time for the first node to wake up and listen for or broadcast a signal regarding communication with a parent or child node, the wake up time being determined based on a detected temperature at the first node, wherein determining further comprises:

determining a wake up time period;

determining an elapsed time;

comparing the elapsed time to the wake up time period;

controlling the first node to wake up when the elapsed time equals the wake up time period; and wherein the elapsed time is adjusted based on the detected temperature.

2. The method of claim 1, wherein the elapsed time is determined based on a temperature dependent frequency change formula of the form $K1*(T-K2)$, where K1 and K2 are constants and T is the detected temperature.

3. The method of claim 1, wherein the wake up time is determined according to a schedule.

4. The method of claim 1, wherein the first node functions as a parent to a second node, and the first node is controlled to wake up and send a beacon based on a pseudorandom schedule.

5. The method of claim 4, wherein the second node wakes up to communicate with the first node according to the pseudorandom schedule.

6. The method of claim 5; wherein the second node determines a wake up time for the second node that is determined based on a detected temperature at the second node.

7. The method of claim 1, wherein the first node has an internal timer that is used to determine an elapsed time.

8. The method of claim 7, wherein elapsed time determined by the internal timer is adjusted based on the detected temperature.

9. The method of claim 1, wherein the step of determining comprises determining an elapsed time that is adjusted based on the detected temperature using a lookup table.

10. The method of claim 9, wherein values in the lookup table are generated based on empirical measurement of a plurality of different timers.

11. The method of claim 9, wherein a lookup table used to determine the elapsed time is selected based on an age of the node.

12. The method of claim 9, wherein a lookup table used to determine the elapsed time is selected based on whether the detected temperature is increasing, decreasing or constant.

13. The method of claim 1, wherein the wake up time is determined based on a clock skew determined between a clock in the first node and a clock in a parent or child node.

14. The method of claim 1, wherein the first node is a router and the second node is an edge node.

15. The method of claim 1, wherein the first and second nodes are routers.

16. A method for coordinating communication in a wireless sensor network, comprising:

associating a first node with a wireless sensor network including at least two nodes associated with each other in a parent/child relationship, the first node being associated with the wireless sensor network such that the first node functions as a parent or child to at least one other node;

determining a wake up time for the first node to wake up and listen for a signal regarding communication with a second node that has a parent or child relationship with the first node, the wake up time being determined based on a determined clock skew between a clock in the first node and a clock in the second node, and wherein determining comprises: determining a wake up time period to a next wake up time and adjusting the wake up time period based on the determined clock skew;

controlling the first node to wake up and listen for the signal based on the wake up time, the first node listening for the signal for a first time period;

controlling the first node to wake up and listen for the signal at a subsequent wake up time for a second time period that is longer than the first time period if the first node does not detect the signal during the first time period; and wherein the first node is controlled to not listen for the signal at the subsequent wake up time if the second time period exceeds a threshold;

wherein the second time period is determined based on a lookup table;

and wherein the first node is controlled to not listen for the signal at the subsequent wake up time if values in the lookup table are exhausted.

17. The method of claim 16, wherein the clock skew is determined based on at least one comparison of a predicted signal transmission time with an actual signal transmission time for the second node.

18. The method of claim 16, wherein the first node is a child of the second node.

19. The method of claim 16, wherein the signal is a beacon and the second node emits a beacon on a defined schedule.

20. The method of claim 16, wherein the step of determining comprises:

determining an elapsed time;

comparing the elapsed time to a wake up time period; and controlling the first node to wake up at the wake up time when the elapsed time equals the wake up time period.

21. The method of claim 16, wherein the wake up time is determined based on a detected temperature at the first node.

22. The method of claim 16, wherein the first node is an edge node, and the second node is a router.

* * * * *